US009854635B2

(12) United States Patent
Liu et al.

(10) Patent No.: US 9,854,635 B2
(45) Date of Patent: Dec. 26, 2017

(54) TEMPERATURE ADAPTIVE CONTROL CIRCUIT FOR A LIGHT EMITTING DIODE, LIGHTING AND/OR SIGNALING APPARATUS

(71) Applicant: VALEO LIGHTING HUBEI TECHNICAL CENTER CO. LTD., Wuhan (CN)

(72) Inventors: Dan-Danny Liu, Foshan (CN); Sylvain Yvon, Foshan (CN); Biao-Robert Luo, Foshan (CN)

(73) Assignee: VALEO LIGHTING HUBEI TECHNICAL CENTER CO. LTD., Wuhan (CN)

( * ) Notice: Subject to any disclaimer, the term of this patent is extended or adjusted under 35 U.S.C. 154(b) by 0 days.

(21) Appl. No.: 15/369,232

(22) Filed: Dec. 5, 2016

(65) Prior Publication Data

US 2017/0164443 A1 Jun. 8, 2017

(30) Foreign Application Priority Data

Dec. 4, 2015 (CN) .......................... 2015 1 0887192

(51) Int. Cl.
*H05B 33/00* (2006.01)
*H05B 33/08* (2006.01)
(52) U.S. Cl.
CPC ..... *H05B 33/0851* (2013.01); *H05B 33/0806* (2013.01); *H05B 33/089* (2013.01); *H05B 33/0812* (2013.01); *H05B 33/0854* (2013.01)
(58) Field of Classification Search
CPC .... H03H 7/40; H03H 2001/0057; H03H 1/00; H05B 33/0854; H05B 33/0815; H05B 33/0803; H05B 33/0809; H05B 33/0845; H05B 33/0884; H05B 33/089; H05B 37/0227; H05B 2203/02; H05B 2213/07; H05B 33/081
See application file for complete search history.

(56) References Cited

U.S. PATENT DOCUMENTS

| 8,476,836 B2 * | 7/2013 | van de Ven | ........ H05B 33/0809 |
| | | | 315/185 R |
| 8,502,479 B2 * | 8/2013 | Kao | ................... H05B 33/0809 |
| | | | 315/195 |
| 9,454,172 B2 * | 9/2016 | Kim | ....................... G05F 1/613 |

* cited by examiner

*Primary Examiner* — Monica C King
(74) *Attorney, Agent, or Firm* — Oblon, McClelland, Maier & Neustadt, L.L.P.

(57) ABSTRACT

An embodiment of the present application provides a temperature adaptive control circuit for a light emitting diode and a lighting and/or signaling apparatus. The control circuit includes: a light emitting diode load circuit unit in which one or more light emitting diodes are connected; and a temperature adaptive circuit unit comprising a positive temperature coefficient thermistor and a negative temperature coefficient thermistor connected in series, wherein the temperature adaptive circuit unit is configured such that current flowing through the one or more light emitting diodes in the light emitting diode load circuit unit is a function of sum of resistance of the positive temperature coefficient thermistor and resistance of the negative temperature coefficient thermistor. It not only can compensate the variation of the luminescent intensity with the temperature in a desired working temperature for the LEDs, but also can achieve overheating protection for the LEDs to avoid damage thereof.

15 Claims, 5 Drawing Sheets

TEMPERATURE ADAPTIVE CONTROL CIRCUIT FOR A LIGHT EMITTING DIODE, LIGHTING AND/OR SIGNALING APPARATUS

TECHNICAL FIELD

The present application relates to the field of lighting and control, and in particular, to a temperature adaptive control circuit for a light emitting diode, a lighting and/or signaling apparatus.

BACKGROUND

The light emitting diode (LED), as a light emitting device with low power consumption and high brightness, is applied in various apparatuses such as illumination, decoration, signaling apparatuses more and more widely. It is very crucial to control a current of the LED due to its high heat productivity. In order to ensure the LED to work stably, a complex feedback control loop circuit is typically used. However, such control circuit has a high cost, but single function of controlling current. It is desired to provide a cheap, multi-functional and reliable LED control circuit.

SUMMARY

The present application has an object of providing a temperature adaptive control circuit for a light emitting diode, which can adjust the current of the LED depending on change of conditions, such that the LED can emit a light stably and overheating protection can be provided for the LED. The present application also provides a lighting and/or signaling apparatus having the temperature adaptive control circuit.

An embodiment of the present invention provides a temperature adaptive control circuit for a light emitting diode, including:

a light emitting diode load circuit unit in which one or more light emitting diodes are connected; and a temperature adaptive circuit unit including a positive temperature coefficient thermistor and a negative temperature coefficient thermistor connected in series, wherein the temperature adaptive circuit unit is configured such that current flowing through the one or more light emitting diodes in the light emitting diode load circuit unit is a function of sum of resistance of the positive temperature coefficient thermistor and resistance of the negative temperature coefficient thermistor.

In an embodiment, the temperature adaptive circuit unit is configured such that current flowing through the one or more light emitting diodes in the light emitting diode load circuit unit is a decreasing function of sum of resistance of the positive temperature coefficient thermistor and resistance of the negative temperature coefficient thermistor.

In an embodiment, the positive temperature coefficient thermistor and the negative temperature coefficient thermistor are connected in series or in parallel with the light emitting diode load circuit unit.

In an embodiment, the temperature adaptive circuit unit has a temperature adaptive control node and the voltage of the temperature adaptive control node varies as the sum of the resistance of the positive temperature coefficient thermistor and the resistance of the negative temperature coefficient thermistor varies, and any one of two ends of the light emitting diode load circuit unit is electrically connected with the temperature adaptive control node.

In an embodiment, the temperature adaptive circuit unit has a temperature adaptive control node and the voltage of the temperature adaptive control node varies as the sum of the resistance of the positive temperature coefficient thermistor and the resistance of the negative temperature coefficient thermistor varies, and the temperature adaptive control circuit further includes:

an intermediate circuit unit having an input end, which is electrically connected to the temperature adaptive control node, and an output end, which is electrically connected to any one of two ends of the light emitting diode load circuit unit.

In an embodiment, the intermediate circuit unit is configured such that the voltage or current of the output end is an increasing function of the voltage of the input end.

In an embodiment, a first node and a second node are provided at two ends of the light emitting diode load circuit unit respectively, the first node having a higher voltage than the second node, the first node being electrically connected to the output end of the intermediate circuit unit.

In an embodiment, a first node and a second node are provided at two ends of the light emitting diode load circuit unit respectively, the first node having a higher voltage than the second node, the second node being electrically connected to the output end of the intermediate circuit unit.

In an embodiment, the intermediate circuit unit includes an operational amplifier, or other control chips or integrated circuits.

In an embodiment, the temperature adaptive circuit unit further includes:

a first resistor connected in series with the positive temperature coefficient thermistor and the negative temperature coefficient thermistor; and a second resistor connected in parallel with the first resistor, the positive temperature coefficient thermistor and the negative temperature coefficient thermistor connected in series to form a parallel circuit unit.

In an embodiment, the temperature adaptive circuit unit further includes a third resistor and a capacitor, and the third resistor is connected in parallel with the capacitor and then connected in series with the parallel circuit unit.

In an embodiment, the positive temperature coefficient thermistor has a Curie temperature between a predetermined work temperature and a predetermined overheating temperature of the light emitting diode.

In an embodiment, the temperature adaptive circuit unit is configured such that the sum of the resistance of the positive temperature coefficient thermistor and the resistance of the negative temperature coefficient thermistor decreases before it reaches the predetermined overheating temperature as the temperature rises, while the sum of the resistance of the positive temperature coefficient thermistor and the resistance of the negative temperature coefficient thermistor increases after it reaches the predetermined overheating temperature as the temperature rises.

In an embodiment, the slope of change of the sum of the resistance of the positive temperature coefficient thermistor and the resistance of the negative temperature coefficient thermistor which decreases before it reaches the predetermined overheating temperature as the temperature rises, is less than the slope of change of the sum of the resistance of the positive temperature coefficient thermistor and the resistance of the negative temperature coefficient thermistor which increases after it reaches the predetermined overheating temperature as the temperature rises.

An embodiment of the present invention also provides a lighting and/or signaling apparatus, including:

the temperature adaptive control circuit for a light emitting diode as described in any one of the above embodiments.

The temperature adaptive control circuit according to at least one of the above embodiments and the lighting and/or signaling apparatus including the temperature adaptive control circuit, not only can compensate the variation of the luminescent intensity of the LEDs with the temperature in a desired working temperature of the LEDs, but also can achieve overheating protection for the LEDs to avoid their damage.

DETAILED DESCRIPTION OF THE EMBODIMENTS

The embodiments of the present invention will be further explained below with reference to the figures and examples. Throughout the description, the same or similar reference numbers indicate the same or similar members. The following embodiments along with the figures are only used to explain the general concept of the present invention, instead of being intended to limit the scope of the present invention.

According to the general inventive concept of the present disclosure, it provides a temperature adaptive control circuit for a light emitting diode, including: a light emitting diode load circuit unit in which one or more light emitting diodes are connected; and a temperature adaptive circuit unit including a positive temperature coefficient thermistor and a negative temperature coefficient thermistor connected in series, wherein the temperature adaptive circuit unit is configured such that current flowing through the one or more light emitting diodes in the light emitting diode load circuit unit is a function of sum of resistance of the positive temperature coefficient thermistor and resistance of the negative temperature coefficient thermistor.

In addition, for the purpose of explanation, numerous specific details are set forth in the following detailed description to provide a thorough understanding to the embodiments of the present invention. It is obvious, however, that one or more embodiments can also be implemented without these specific details.

Figure 1:
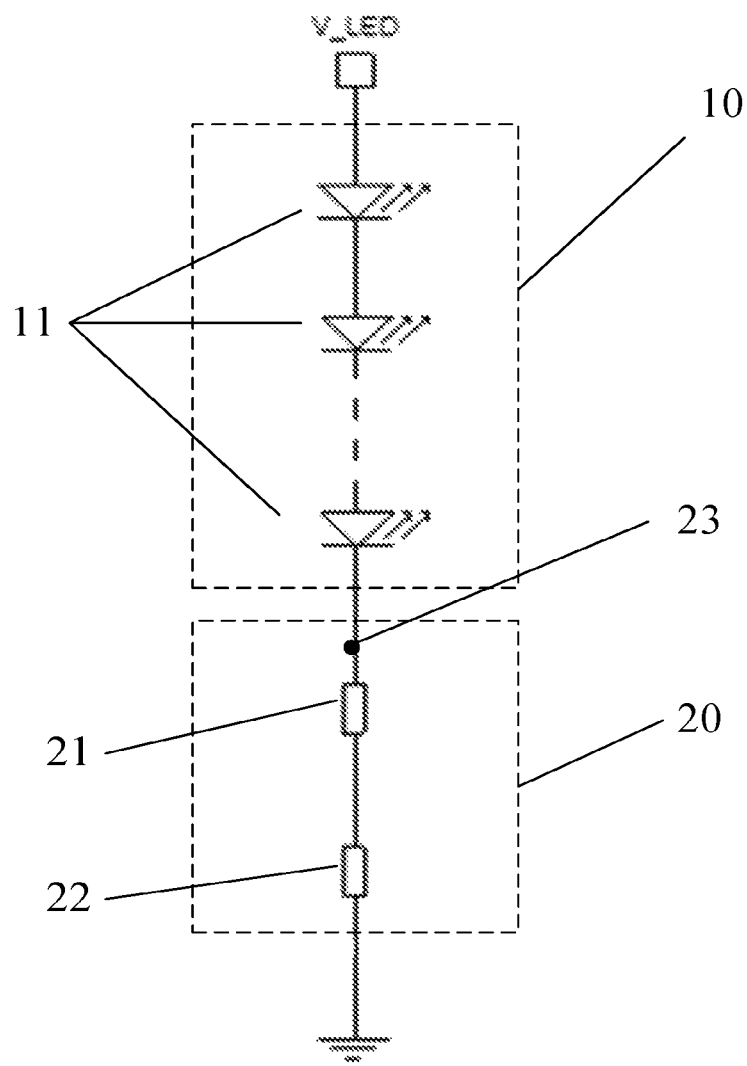
FIG. 1 is a schematic view showing a temperature adaptive control circuit for a light emitting diode according to an embodiment of the present invention.

FIG. 1 shows schematically a temperature adaptive control circuit 100 for a light emitting diode in accordance with an embodiment of the present application. The temperature adaptive control circuit 100 includes: a light emitting diode load circuit unit 10 in which one or more light emitting diodes 11 are connected (for example, connected in series or in parallel); and a temperature adaptive circuit unit 20 which includes a positive temperature coefficient (PTC) thermistor 21 and a negative temperature coefficient (NTC) thermistor 22 connected in series. The temperature adaptive circuit unit 20 is configured such that current flowing through the one or more light emitting diodes 11 in the light emitting diode load circuit unit 10 is a decreasing function of sum of resistance of the positive temperature coefficient thermistor 21 and resistance of the negative temperature coefficient thermistor 22.

The skilled person in the art should understand that the above term of "decreasing function" means that the current flowing through the one or more light emitting diodes 11 in the light emitting diode load circuit unit 10 is reduced as the sum of resistance of the positive temperature coefficient thermistor 21 and resistance of the negative temperature coefficient thermistor 22 increases (for example, due to the change of temperature of the temperature adaptive circuit unit 20); otherwise, the current flowing through the one or more light emitting diodes 11 in the light emitting diode load circuit unit 10 increases as the sum of resistance of the positive temperature coefficient thermistor 21 and resistance of the negative temperature coefficient thermistor 22 is reduced.

For example, in the example shown in FIG. 1, the positive temperature coefficient thermistor 21 and the negative temperature coefficient thermistor 22 are connected in series to the light emitting diode load circuit unit 10. Thus, when the sum of resistance of the positive temperature coefficient thermistor 21 and resistance of the negative temperature coefficient thermistor 22 increases, the current flowing through the positive temperature coefficient thermistor 21 and the negative temperature coefficient thermistor 22 is reduced and thus the current flowing through the light emitting diodes 11 is also reduced , and vice versa.

Figure 2:
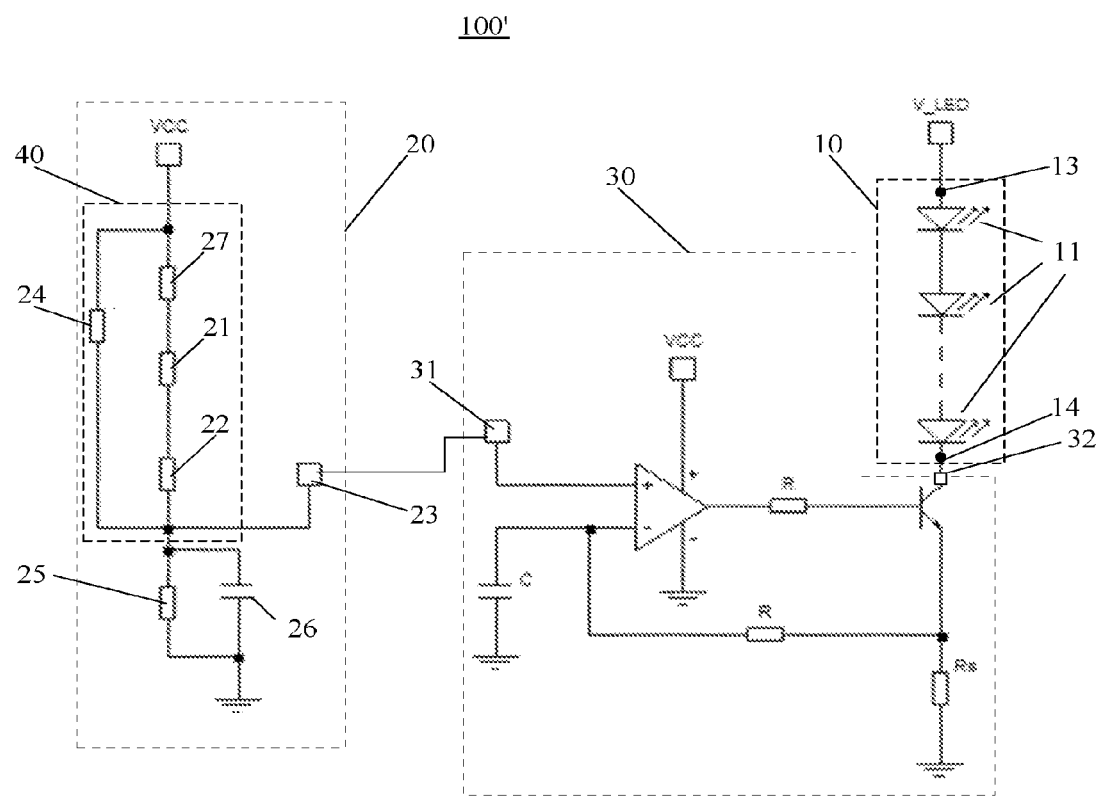
FIG. 2 is a schematic view showing a temperature adaptive control circuit for a light emitting diode according to another embodiment of the present invention.

In FIG. 1 and FIG. 2, V_LED indicates a voltage applied to high voltage side of the light emitting diode load circuit unit 10, which may be determined depending on work voltage of the light emitting diodes.

The current flowing through the light emitting diodes 11 arranged as a decreasing function of sum of resistance of the positive temperature coefficient thermistor 21 and resistance of the negative temperature coefficient thermistor 22, may achieve an adaptive control of the current on the basis of the temperature.

In the above example shown in FIG. 1, the positive temperature coefficient thermistor 21 and the negative temperature coefficient thermistor 22 are connected in series to the light emitting diode load circuit unit 10. However, the embodiments of the present invention are not limited to this, for example, the positive temperature coefficient thermistor 21 and the negative temperature coefficient thermistor 22 may also be connected in parallel with the light emitting diode load circuit unit 10.

The positive temperature coefficient thermistor 21 and the negative temperature coefficient thermistor 22 are two known types of thermistors in the art. For example, each of the positive temperature coefficient thermistor 21 and the negative temperature coefficient thermistor 22 may be made from semiconductor ceramics, composite oxide ceramics, macromolecule materials or any other known materials in the art having property that their resistance changes as the temperature varies.

Figure 3:
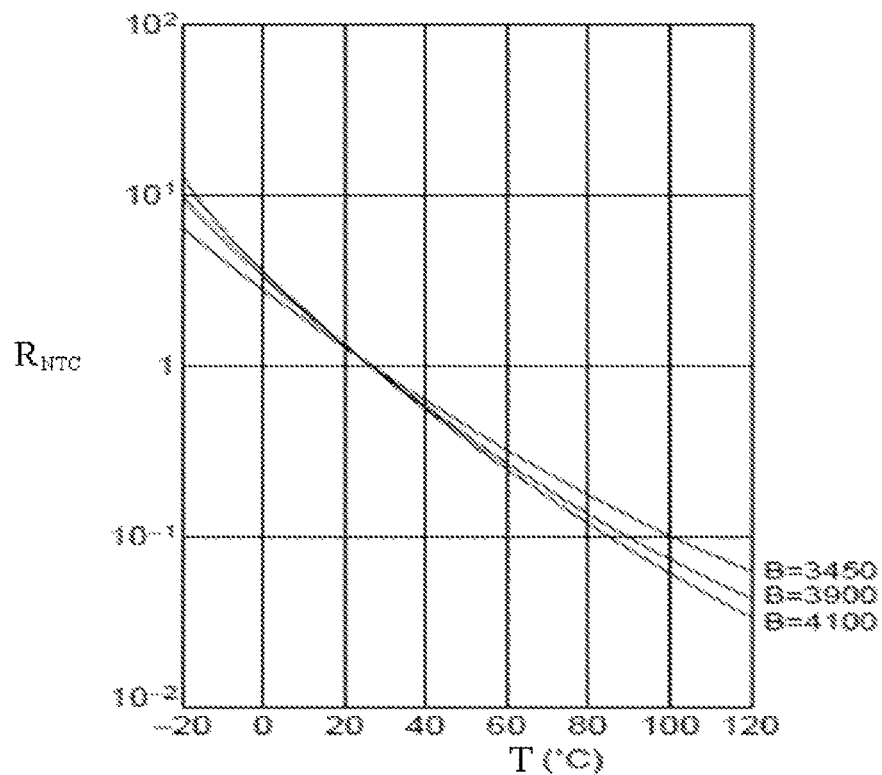
FIG. 3 is a graph of resistance of a negative temperature coefficient thermistor v.s. temperature in an example.
Figure 4:
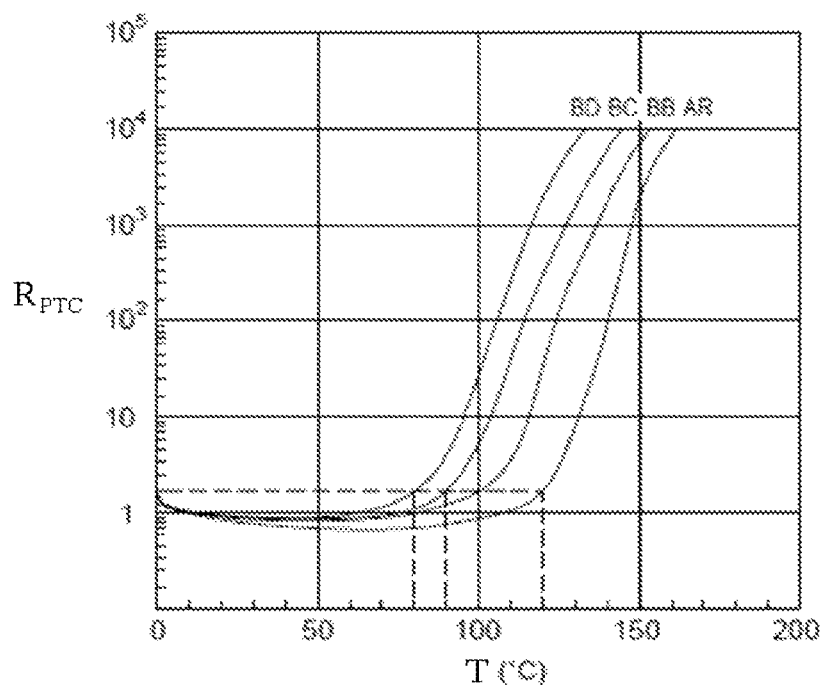
FIG. 4 is a graph of resistance of a positive temperature coefficient thermistor v.s. temperature in an example.

FIG. 3 and FIG. 4 show a typical graph of resistance $R_{NTC}$ of a negative temperature coefficient thermistor 22 v.s. temperature T and a typical graph of resistance $R_{PTC}$ of a positive temperature coefficient thermistor 21 v.s. temperature T. In convenience of illustration, the resistance $R_{NTC}$ and the resistance $R_{PTC}$ in FIG. 3 and FIG. 4 both are normalized. It can be seen from FIG. 3 that the resistance of the negative temperature coefficient thermistor 22 decreases gradually as the temperature increases. FIG. 3 shows change of the resistances of the negative temperature coefficient thermistors 22 having different material constants (3450, 3900, 4100). FIG. 4 shows change of the resistances of the positive temperature coefficient thermistors 21 made from different materials (indicated by BD, BC, BB, AR). It can be seen from FIG. 4 that the resistances of the positive temperature coefficient thermistors 21 change a little in a low temperature range as the temperature rises, however, once the temperature exceeds a certain temperature, the resistances will increase sharply as the temperature rises. The certain temperature is called as curie temperature.

It can be seen from FIG. 3 and FIG. 4 that the change trend of resistances of the negative temperature coefficient thermistors 22 with variation of temperature is generally to opposite to that of resistances of the positive temperature coefficient thermistors 21 with variation of temperature. The resistances of the negative temperature coefficient thermistors 22 change in a relative stable manner as temperature varies. In contrast, the resistances of the positive temperature coefficient thermistors 21 change a little in low temperature range, but change largely in a high temperature range. Based on the above characteristics, the negative temperature coefficient thermistor 22 and the positive temperature coefficient thermistor 21 may be used in combination to achieve good control of current of LED.

At first, when the temperature is relatively low (for example, the temperature is lower than the curie temperature of the positive temperature coefficient thermistor 21), because the resistance of the positive temperature coefficient thermistor 21 is influenced weakly by the temperature, the change of the sum of resistance of the positive temperature coefficient thermistor 21 and resistance of the negative temperature coefficient thermistor 22 mainly depends on the negative temperature coefficient thermistor 22. Thus, the sum of resistance of the positive temperature coefficient thermistor 21 and resistance of the negative temperature coefficient thermistor 22 decreases gradually as the temperature rises, and correspondingly, the current flowing through the light emitting diodes 11 increases gradually. Due to the characteristics of the light emitting diodes 11 themselves, when the temperature rises, if their driving current is constant, their luminescent intensity will be reduced. It is the characteristics of the positive temperature coefficient thermistor 21 and the negative temperature coefficient thermistor 22 that may compensate the luminescent intensity of the light emitting diodes 11. In particular, when the luminescent intensity of the light emitting diodes 11 is reduced as the temperature rises, the current flowing through the light emitting diodes 11 may increase as temperature rises, as discussed above, thus, the luminescent intensity of the light emitting diodes 11 may increase due to increase of the current. In this way, it may compensate the luminescent intensity of the light emitting diodes 11. As an example, with the above compensation effects of the positive temperature coefficient thermistor 21 and the negative temperature coefficient thermistor 22, the luminescent intensity of the light emitting diodes 11 may be kept substantially constant, for example, the amplitude of variation of the luminescent intensity of the light emitting diodes 11 may be kept within 15% or 10%, as the temperature rises (in a normal work). However, embodiments of the present invention are not limited to this, as long as the positive temperature coefficient thermistor 21 and the negative temperature coefficient thermistor 22 can compensate the luminescent intensity of the light emitting diodes 11.

In addition, when the temperature is relatively high (for example, the temperature is greater than the curie temperature of the positive temperature coefficient thermistor 21), because the resistance of the positive temperature coefficient thermistor 21 increases sharply as the temperature rises, the change of the sum of resistance of the positive temperature coefficient thermistor 21 and resistance of the negative temperature coefficient thermistor 22 gradually becomes to mainly depend on the positive temperature coefficient thermistor 21. Thus, the sum of resistance of the positive temperature coefficient thermistor 21 and resistance of the negative temperature coefficient thermistor 22 increases significantly as the temperature rises, and correspondingly, the current flowing through the light emitting diodes 11 decreases significantly as the temperature rises. The characteristics of the positive temperature coefficient thermistor 21 and the negative temperature coefficient thermistor 22 may be used to provide overheating protection for the light emitting diodes 11. The skilled person in the art would appreciate that the light emitting diodes 11 should not work at a too high temperature; otherwise, it may be damaged. Thus, a predetermined overheating temperature may be set to prevent the work temperature of the light emitting diodes 11 from exceeding the overheating temperature to protect the light emitting diodes 11 from being damaged. By causing the current flowing through the light emitting diodes 11 to begin to fall significantly at the predetermined overheating temperature or in the vicinity of the predetermined overheating temperature, even stopping the light emitting diodes 11 to work, the light emitting diodes 11 may be prevented from being damaged due to overheating.

As discussed above, the temperature adaptive control circuit 100 according to an embodiment of the present invention can sufficiently use the characteristics of the positive temperature coefficient thermistor 21 and the negative temperature coefficient thermistor 22 to compensate the reduction of brightness of the light emitting diodes 11 caused by increase of the temperature so as to prevent the light emitting diodes 11 from being damaged due to overheating. The specific parameters of the positive temperature coefficient thermistor 21 and the negative temperature coefficient thermistor 22 may be selected as required. And the temperature adaptive control circuit 100 adjusts the current flowing through the light emitting diodes 11 automatically depending on variation of the temperature, i.e., it is adaptive. Certainly, if required, operators may also adjust the work parameters or conditions of the temperature adaptive control circuit 100 as required.

Figure 5:
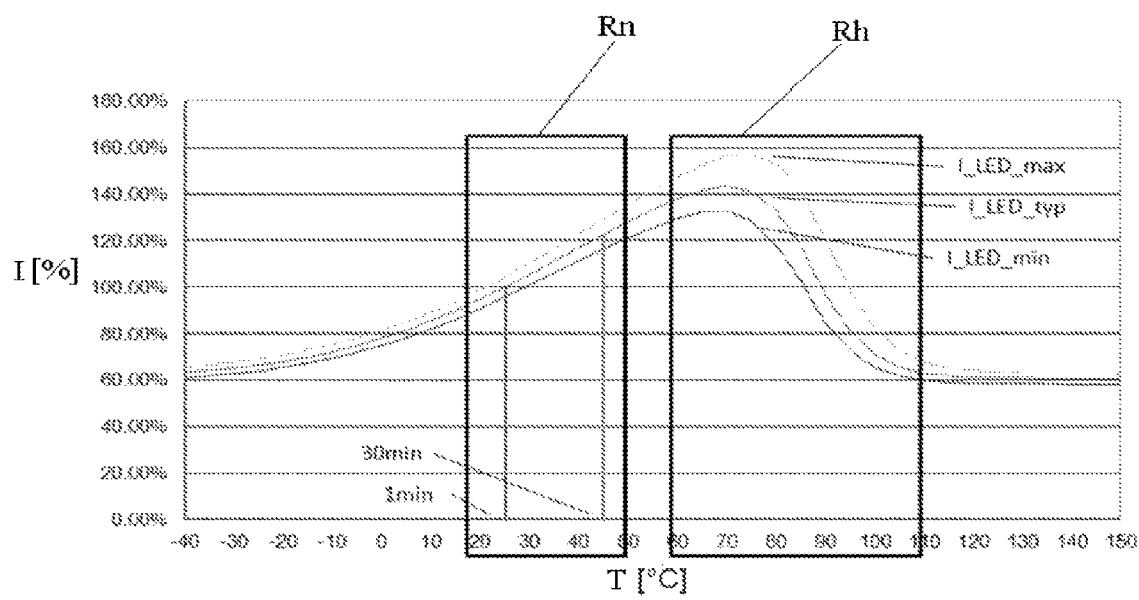
FIG. 5 is a exemplary graph of a current passing through the LED v.s. temperature under the control of a temperature adaptive control circuit for a light emitting diode according to another embodiment of the present invention.

FIG. 5 shows an exemplary graph of the current I flowing through the light emitting diodes 11 v.s. the temperature T under the control of the temperature adaptive control circuit 100 according to an embodiment of the present invention. The left block (range from 20☐ to 50☐) in FIG. 5 shows an exemplary desired normal work temperature range Rn of LED. In the range Rn, the current increases gradually as the temperature increases. The right block in FIG. 5 shows a high temperature region Rh (60☐ to 110☐). In the high temperature region, the current reaches the peak value rapidly and then falls sharply. FIG. 5 shows three curves I_LED_max, I_LED_typ and I_LED_min. They correspond to the temperature adaptive control circuit 100 with different parameters respectively. It can be seen from FIG. 5 that the slope of variation (or called as variation ratio) of the current v.s. the temperature in an ascent section (current increases as the temperature rises) is smaller than the slope of variation of the current v.s. the temperature in a decent section (current decreases as the temperature rises). It may not only keep the stability of luminescent intensity of the LEDs in a normal work range, but also help to rapidly reduce the current when the temperature is relatively high, to avoid damage of the LEDs. For sake of convenience, current value of longitudinal ordinate in FIG. 5 is shown in a form of percentage. The current value of 100% corresponds to the value of I LED typ at 25□. Two vertical lines in the Rn region in FIG. 5 indicate current values of the LEDs when the LEDs are lighten for 1 minute and for 30 minutes. During lighting the LEDs from 1 minute to 30 minutes, the temperature of the LEDs will increase gradually due to the heat generated by the LEDs. On the basis of the above effects of the temperature adaptive control circuit 100, the current flowing through the LEDs may increase and the increase of the current may also raise the temperature in some extent. It can also be seen from variations of the two current values that the current in the Rn region increases as the temperature rises. FIG. 5 is illustrative, and embodiments of the present invention are not limited to this.

In an example, the temperature adaptive circuit unit 20 has a temperature adaptive control node 23 and the voltage of the temperature adaptive control node 23 varies as the sum of the resistance of the positive temperature coefficient thermistor 21 and the resistance of the negative temperature coefficient thermistor 22 varies, and any one of two ends of the light emitting diode load circuit unit 10 is electrically connected with the temperature adaptive control node 23. In the example shown in FIG. 1, the temperature adaptive control node 23 is a node connecting the light emitting diode load circuit unit 10 with the temperature adaptive circuit unit 20. It should be noted that the positions of the light emitting diode load circuit unit 10 and the temperature adaptive circuit unit 20 may be exchanged.

In an example, the temperature adaptive control circuit 100' may further include: an intermediate circuit unit 30 having an input end 31, which is electrically connected to the temperature adaptive control node 23, and an output end 32, which is electrically connected to any one of two ends of the light emitting diode load circuit unit 10. In the example shown in FIG. 2, the output end 32 is electrically connected to a low voltage end of the light emitting diode load circuit unit 10. However, embodiments of the present invention are not limited to this. In other examples, the output end 32 of the intermediate circuit unit 30 may also be electrically connected to a high voltage end of the light emitting diode load circuit unit 10. The intermediate circuit unit 30 is used to connect the temperature adaptive control node 23 with the light emitting diode load circuit unit 10. It may for example improve the stability of system and flexibility of design.

As an example, the intermediate circuit unit 30 may be configured such that the output current (or voltage) of the output end 32 is an increasing function of the voltage of the input end 31. So-called increasing function means that the output current (or voltage) of the output end 32 increases as the voltage of the input end 31 increases, otherwise, the output current (or voltage) of the output end 32 decreases as the voltage of the input end 31 decreases. It ensures that the temperature adaptive circuit unit 20 can control the voltage or current of the light emitting diode load circuit unit 10 by controlling the voltage of the temperature adaptive control node 23, so as to control the current flowing through the light emitting diodes 11.

In an example, the intermediate circuit unit 30 may include operational amplifiers or other control chips or integrated circuits or the like, such as other known integrated circuit devices. It may be configured to improve anti-interference characteristics of circuits. Besides the operational amplifiers, the intermediate circuit unit 30 may further include corresponding resistors and capacitors (for example shown in FIG. 2) to achieve the corresponding functions. In the example shown in FIG. 2, the intermediate circuit unit 30 includes elements such as an operational amplifier, a transistor, resistors R, Rs and a capacitor C. It may ensure the output current (or voltage) of the output end 32 to be an increasing function of the voltage of the input end 31. In the example shown in FIG. 2, the intermediate circuit unit 30 is configured such that the voltage of the upper end node of the resistor Rs is substantially same to the voltage of the input end 31, for example, the difference between the voltage of the upper end node of the resistor Rs and the voltage of the input end 31 is not more than 10% of the latter. It is helpful to control the current flowing through the light emitting diodes 11 via the temperature adaptive control node 23. As an example, the difference between the voltage of the upper end node of the resistor Rs and the voltage of the input end 31 may not be more than 1% of the latter.

The specific circuit for achieving the above relation between the voltage of the upper end node of the resistor Rs and the voltage of the input end 31 is known in the art, instead of being limited by the structure shown in FIG. 2.

Figure 6:
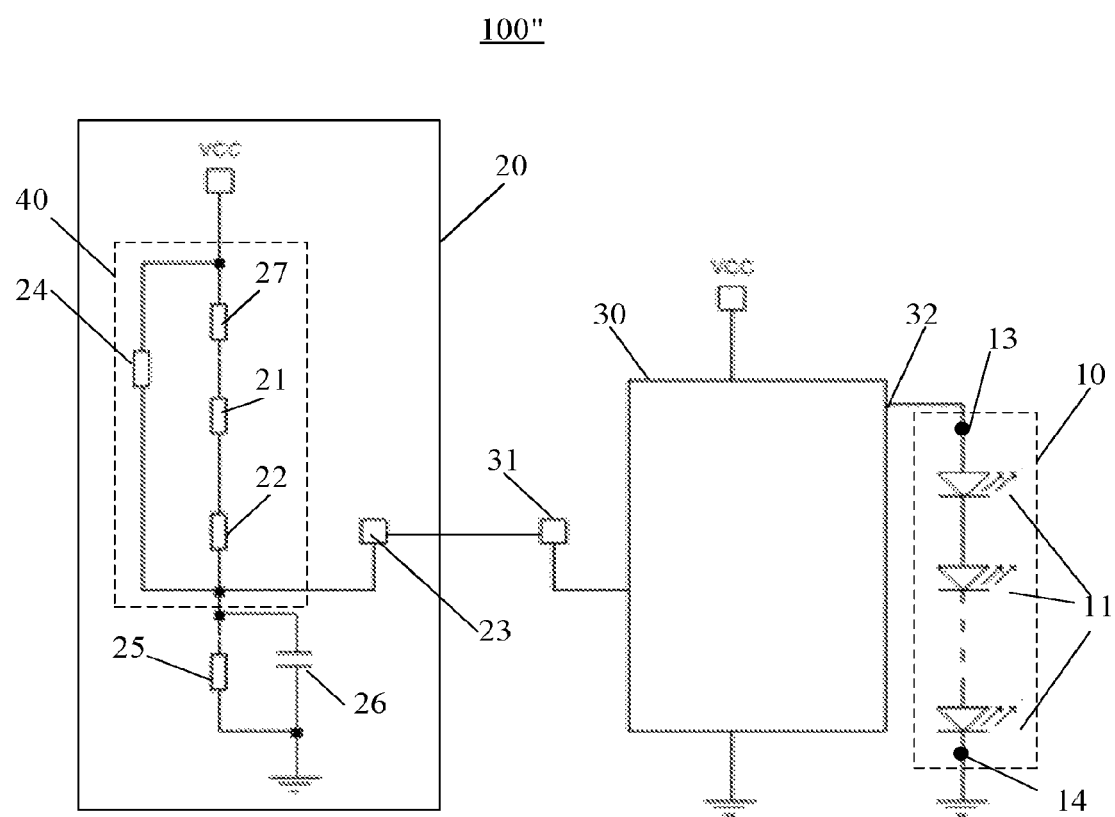
FIG. 6 is a schematic view showing a temperature adaptive control circuit for a light emitting diode according to a further embodiment of the present invention.

In an example, a first node 13 and a second node 14 are provided at two ends of the light emitting diode load circuit unit 10 respectively. The first node 13 has a higher voltage than the second node 14, and the second node 14 is electrically connected to the output end 32 of the intermediate circuit unit 30. In the example shown in FIG. 2, the output end 32 of the intermediate circuit unit 30 is electrically connected to the low voltage end (second node 14) of the light emitting diode load circuit unit 10. However, embodiments of the present invention are not limited to this. In other examples, the output end 32 of the intermediate circuit unit 30 may also be electrically connected to the high voltage end (first node 13) of the light emitting diode load circuit unit 10. FIG. 6 shows a temperature adaptive control circuit 100" according to a further embodiment of the present invention. In the example, the intermediate circuit unit 30 includes a current control circuit (represented by a rectangular block in FIG. 6) and the current (or voltage) of its output end 32 may be an increasing function of the voltage of the input end 31. That is, the current (or voltage) of the output end 32 increases as the voltage of the input end 31 increases; otherwise, the current (or voltage) of the output end 32 decreases as the voltage of the input end 31 decreases. Such current (or voltage) control circuit may be in a form of integrated circuit, or may be in a form of separate circuits, which are known in the prior art. In the embodiment shown in FIG. 6, the output end of the current control circuit (i.e., the output end 32 of the intermediate circuit unit 30) is electrically connected to the high voltage end (first node 13) of the light emitting diode load circuit unit 10. Such circuit structure may also be used to achieve control of current flowing through the light emitting diodes 11 by the temperature adaptive control node 23.

In an example, the temperature adaptive circuit unit 20 may further include: a first resistor 27 connected in series with the positive temperature coefficient thermistor 21 and the negative temperature coefficient thermistor 22; and a second resistor 24 connected in parallel with the first resistor 27, the positive temperature coefficient thermistor 21 and the negative temperature coefficient thermistor 22 connected in series to form a parallel circuit unit 40, as shown in FIG. 2. The first resistor 27 and the second resistor 24 may be arranged to adjust the ascent or descent slope of the current flowing through the LEDs. As required, the skilled person in the art can select such as supply voltage, work current region of LEDs, ranges of resistances of the positive temperature coefficient thermistor 21 and the negative temperature coefficient thermistor 22. For example, the first resistor 27 and the second resistor 24 may have resistances between 1 kΩ and 100 kΩ, or may have resistances of tens of, hundreds of, or even several ohms. As an example, the temperature adaptive circuit unit 20 may further include a third resistor 25 and a capacitor 26, and the third resistor 25 is connected in parallel with the capacitor 26 and then connected in series with the parallel circuit unit 40. The third resistor 25 may be arranged to adjust the base voltage of the temperature adaptive control node 23 and the capacitor 26 may be arranged to remove AC interference signals. The relationship between the voltage of the temperature adaptive control node 23 and the above resistors may be determined from knowledge known in the art, such as Ohm's law, calculation of resistances of resistors connected in series or in parallel. In an example, the curie temperature of the positive temperature coefficient thermistor 21 is between a predetermined work temperature and a predetermined overheating temperature of the light emitting diodes 11. In this way, it may help the current to increase with the temperature in the predetermined work temperature of the light emitting diodes 11, but to begin to decrease when the temperature reaches or becomes close to the predetermined overheating temperature. The predetermined work temperature may be a desired work temperature of the light emitting diodes 11, such as room temperature. The predetermined overheating temperature may be set as required in practice. It is typically lower than the maximum temperature that the light emitting diodes 11 can be resisted to.

As an example, the temperature adaptive circuit unit 20 may be configured such that the sum of the resistance of the positive temperature coefficient thermistor 21 and the resistance of the negative temperature coefficient thermistor 22 decreases before it reaches the predetermined overheating temperature as the temperature rises, while the sum of the resistance of the positive temperature coefficient thermistor 21 and the resistance of the negative temperature coefficient thermistor 22 increases after it reaches the predetermined overheating temperature as the temperature rises. The predetermined overheating temperature is meant to peak values of the curves in the example shown in FIG. 5 respectively.

As an example, the slope of change of the sum of the resistance of the positive temperature coefficient thermistor 21 and the resistance of the negative temperature coefficient thermistor 22 which decreases before it reaches the predetermined overheating temperature as the temperature rises, is less than the slope of change of the sum of the resistance of the positive temperature coefficient thermistor 21 and the resistance of the negative temperature coefficient thermistor 22 which increases after it reaches the predetermined overheating temperature as the temperature rises. That is, before the temperature of the temperature adaptive circuit unit 20 reaches the predetermined overheating temperature, the sum of the resistance of the positive temperature coefficient thermistor 21 and the resistance of the negative temperature coefficient thermistor 22 increases slowly as the temperature rises; and after the temperature of the temperature adaptive circuit unit 20 reaches the predetermined overheating temperature, the sum of the resistance of the positive temperature coefficient thermistor 21 and the resistance of the negative temperature coefficient thermistor 22 decreases sharply as the temperature rises. It may help to achieve the above functions of luminescent intensity compensation and overheating protection.

In the above embodiment, the current flowing through the light emitting diodes 11 is a decreasing function of sum of resistance of the positive temperature coefficient thermistor 21 and resistance of the negative temperature coefficient thermistor 22. However, embodiments of the present invention are not limited to this. For example, the current flowing through the light emitting diodes 11 may also be an increasing function of sum of resistance of the positive temperature coefficient thermistor 21 and resistance of the negative temperature coefficient thermistor 22. In such case, a circuit structure different from those in the above embodiment may be needed. For example, in the example shown in FIG. 1, if the series connection of the positive temperature coefficient thermistor 21 and the negative temperature coefficient thermistor 22 and the light emitting diode load circuit unit is replaced by parallel connection of them, the current flowing through the light emitting diodes 11 may become an increasing function of sum of resistance of the positive temperature coefficient thermistor 21 and resistance of the negative temperature coefficient thermistor 22. In this case, the effect of the positive temperature coefficient thermistor 21 and the effect of the negative temperature coefficient thermistor 22 may have functions opposite to those in the above embodiments, but they can also achieve the above luminescent intensity compensation function and overheating protection function. In fact, as long as the current flowing through the one or more light emitting diodes 11 is a function of sum of resistance of the positive temperature coefficient thermistor 21 and resistance of the negative temperature coefficient thermistor 22, the concept of the present invention will be achieved.

In the temperature adaptive control circuit 100, 100', 100" according to embodiments of the present invention, the characteristics of the positive temperature coefficient thermistor and the negative temperature coefficient thermistor are used in combination to achieve the above luminescent intensity compensation function and overheating protection function. And the temperature adaptive control circuit 100, 100', 100" has a relatively simple structure and does need to be controlled by a computing device such as a microcontroller. It may also help to reduce costs and improve stability of system.

The present application provides a lighting and/or signaling apparatus. The lighting and/or signaling apparatus may include: the temperature adaptive control circuit 100, 100', 100" for a light emitting diode as described in any one of the above embodiments.

Although the present description has been explained with reference to figures, the embodiments in figures are illustrative to explain the present disclosure, but are not intended to limit the present invention.

Although some embodiments of the present invention have generally been illustrated and described, it would be appreciated by those skilled in the art that various modifications of the above embodiments may be made without departing from principles and concepts of the present invention. The scope of the present invention is defined by the appended claims and equivalents thereof.

What is claimed is:
1. A temperature adaptive control circuit for a light emitting diode, comprising:

a light emitting diode load circuit unit in which one or more light emitting diodes are connected; and a temperature adaptive circuit unit comprising a positive temperature coefficient thermistor and a negative temperature coefficient thermistor connected in series, wherein the temperature adaptive circuit unit is configured such that current flowing through the one or more light emitting diodes in the light emitting diode load circuit unit is a function of sum of resistance of the positive temperature coefficient thermistor and resistance of the negative temperature coefficient thermistor.

2. The temperature adaptive control circuit for a light emitting diode according to claim 1, wherein the temperature adaptive circuit unit is configured such that current flowing through the one or more light emitting diodes in the light emitting diode load circuit unit is a decreasing function of sum of resistance of the positive temperature coefficient thermistor and resistance of the negative temperature coefficient thermistor.

3. The temperature adaptive control circuit for a light emitting diode according to claim 1, wherein the positive temperature coefficient thermistor and the negative temperature coefficient thermistor are connected in series or in parallel with the light emitting diode load circuit unit.

4. The temperature adaptive control circuit for a light emitting diode according to claim 1, wherein the temperature adaptive circuit unit has a temperature adaptive control node and the voltage of the temperature adaptive control node varies as the sum of the resistance of the positive temperature coefficient thermistor and the resistance of the negative temperature coefficient thermistor varies, and any one of two ends of the light emitting diode load circuit unit is electrically connected with the temperature adaptive control node.

5. The temperature adaptive control circuit for a light emitting diode according to claim 1, wherein the temperature adaptive circuit unit has a temperature adaptive control node and the voltage of the temperature adaptive control node varies as the sum of the resistance of the positive temperature coefficient thermistor and the resistance of the negative temperature coefficient thermistor varies, and the temperature adaptive control circuit further comprises:

an intermediate circuit unit having an input end, which is electrically connected to the temperature adaptive control node, and an output end, which is electrically connected to any one of two ends of the light emitting diode load circuit unit.

6. The temperature adaptive control circuit for a light emitting diode according to claim 5, wherein the intermediate circuit unit is configured such that the voltage or current of the output end is an increasing function of the voltage of the input end.

7. The temperature adaptive control circuit for a light emitting diode according to claim 5, wherein a first node and a second node are provided at two ends of the light emitting diode load circuit unit respectively, the first node having a higher voltage than the second node, the first node being electrically connected to the output end of the intermediate circuit unit.

8. The temperature adaptive control circuit for a light emitting diode according to claim 5, wherein a first node and a second node are provided at two ends of the light emitting diode load circuit unit respectively, the first node having a higher voltage than the second node, the second node being electrically connected to the output end of the intermediate circuit unit.

9. The temperature adaptive control circuit for a light emitting diode according to claim 5, wherein the intermediate circuit unit comprises an operational amplifier, or other control chips or integrated circuits.

10. The temperature adaptive control circuit for a light emitting diode according to claim 1, wherein the temperature adaptive circuit unit further comprises:

a first resistor connected in series with the positive temperature coefficient thermistor and the negative temperature coefficient thermistor; and a second resistor connected in parallel with the first resistor, the positive temperature coefficient thermistor and the negative temperature coefficient thermistor connected in series to form a parallel circuit unit.

11. The temperature adaptive control circuit for a light emitting diode according to claim 10, wherein the temperature adaptive circuit unit further comprises a third resistor and a capacitor, and the third resistor is connected in parallel with the capacitor and then connected in series with the parallel circuit unit.

12. The temperature adaptive control circuit for a light emitting diode according to claim 1, wherein the positive temperature coefficient thermistor has a Curie temperature between a predetermined work temperature and a predetermined overheating temperature of the light emitting diode.

13. The temperature adaptive control circuit for a light emitting diode according to claim 1, wherein the temperature adaptive circuit unit is configured such that the sum of the resistance of the positive temperature coefficient thermistor and the resistance of the negative temperature coefficient thermistor decreases before it reaches a predetermined overheating temperature as the temperature rises, while the sum of the resistance of the positive temperature coefficient thermistor and the resistance of the negative temperature coefficient thermistor increases after it reaches the predetermined overheating temperature as the temperature rises.

14. The temperature adaptive control circuit for a light emitting diode according to claim 13, wherein the slope of change of the sum of the resistance of the positive temperature coefficient thermistor and the resistance of the negative temperature coefficient thermistor which decreases before it reaches the predetermined overheating temperature as the temperature rises, is less than the slope of change of the sum of the resistance of the positive temperature coefficient thermistor and the resistance of the negative temperature coefficient thermistor which increases after it reaches the predetermined overheating temperature as the temperature rises.

15. A lighting and/or signaling apparatus, comprising:
the temperature adaptive control circuit for a light emitting diode according to claim 1.

* * * * *